(12) United States Patent
Chou et al.

(10) Patent No.: US 12,304,786 B2
(45) Date of Patent: May 20, 2025

(54) LIFTING ASSEMBLY HAVING GEAR STRUCTURE AND LIFTING DEVICE HAVING THE SAME

(71) Applicants: Futaijing Precision Electronics (Yantai) Co., Ltd., Yantai (CN); HON HAI PRECISION INDUSTRY CO., LTD., New Taipei (TW)

(72) Inventors: Hun-Yi Chou, New Taipei (TW); Yu-Sheng Chang, New Taipei (TW); Chi-Cheng Wen, New Taipei (TW); Chih-Cheng Lee, New Taipei (TW); Chen-Ting Kao, New Taipei (TW); Yu-Cheng Zhang, New Taipei (TW); Tsung-Hsin Wu, New Taipei (TW); Chiung-Hsiang Wu, New Taipei (TW); Chen Chao, New Taipei (TW); Hsiu-Fu Li, New Taipei (TW); Chang-Ju Hsieh, New Taipei (TW); Sheng-Li Yen, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 321 days.

(21) Appl. No.: 17/903,194

(22) Filed: Sep. 6, 2022

(65) Prior Publication Data
US 2023/0133859 A1 May 4, 2023

(30) Foreign Application Priority Data
Oct. 28, 2021 (CN) .......................... 202111266314.2

(51) Int. Cl.
*B66F 3/44* (2006.01)
*B66F 3/46* (2006.01)

(52) U.S. Cl.
CPC . *B66F 3/44* (2013.01); *B66F 3/46* (2013.01)

(58) Field of Classification Search
None
See application file for complete search history.

(56) References Cited

U.S. PATENT DOCUMENTS

| 1,709,746 | A | * | 4/1929 | Schwerin | .................. | B66F 3/12 |
| | | | | | | 254/122 |
| 2,531,880 | A | * | 11/1950 | Herring | .................. | A47B 21/02 |
| | | | | | | 248/669 |

(Continued)

FOREIGN PATENT DOCUMENTS

| CN | 2383832 Y | 6/2000 |
| CN | 210214663 U | 3/2020 |
| TW | 201020200 A1 | 6/2010 |

*Primary Examiner* — Bryan R Muller
*Assistant Examiner* — Dana Lee Poon
(74) *Attorney, Agent, or Firm* — ScienBiziP, P.C.

(57) ABSTRACT

A lifting structure operating precisely and stably at all stages of a lifting and lowering action includes a lifting assembly and a driving assembly. The lifting assembly includes two first links, two second links, and two seats. A first connecting arm of each first link has first and second ends, the first end having a first gear structure. A second connecting arm of each second link has third and fourth ends, a second and complementary gear structure being provided on the third end. The first gear structures are engaged and the second gear structures are engaged. The second end is rotatably connected to the fourth end through one of the two seats. The driving assembly can drive the two seats towards each other to perform lifting or drive them away from each other to perform lowering.

12 Claims, 8 Drawing Sheets

(56) References Cited

U.S. PATENT DOCUMENTS

| | | | | | |
|---|---|---|---|---|---|
| 3,857,548 | A | * | 12/1974 | Takeuchi | B66F 3/12 |
| | | | | | 254/126 |
| 5,445,353 | A | * | 8/1995 | Sakamoto | A61D 3/00 |
| | | | | | 248/185.1 |
| 5,458,316 | A | * | 10/1995 | Engel | B66F 3/12 |
| | | | | | 254/126 |
| 6,695,289 | B1 | * | 2/2004 | Mickael | B66F 3/44 |
| | | | | | 187/211 |
| 2005/0218385 | A1 | * | 10/2005 | Lemelson | B66F 3/12 |
| | | | | | 254/126 |
| 2007/0018145 | A1 | * | 1/2007 | Wang | B66F 3/12 |
| | | | | | 254/126 |

* cited by examiner

LIFTING ASSEMBLY HAVING GEAR STRUCTURE AND LIFTING DEVICE HAVING THE SAME

FIELD

The subject matter herein generally relates to electric charging, and more particularly, to a lifting assembly and a lifting device having the lifting assembly.

BACKGROUND

Robots may include lifting devices. The robot can move an object through lifting or lowering the lifting device. However, the lifting and lowering process of the lifting device is not stable. Therefore, there is room for improvement in the art.

BRIEF DESCRIPTION OF THE DRAWINGS

Implementations of the present technology will now be described, by way of embodiment, with reference to the attached figures.

DETAILED DESCRIPTION

Figure 1:
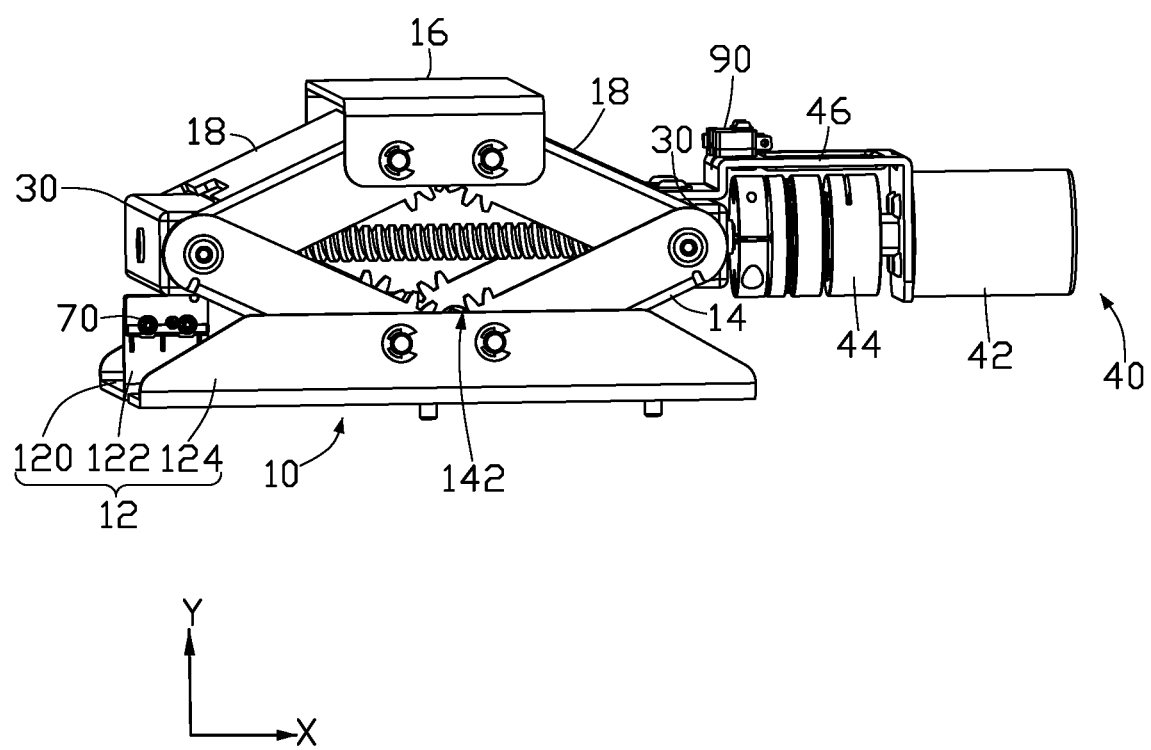
FIG. 1 is a diagrammatic view of a lifting structure according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and members have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
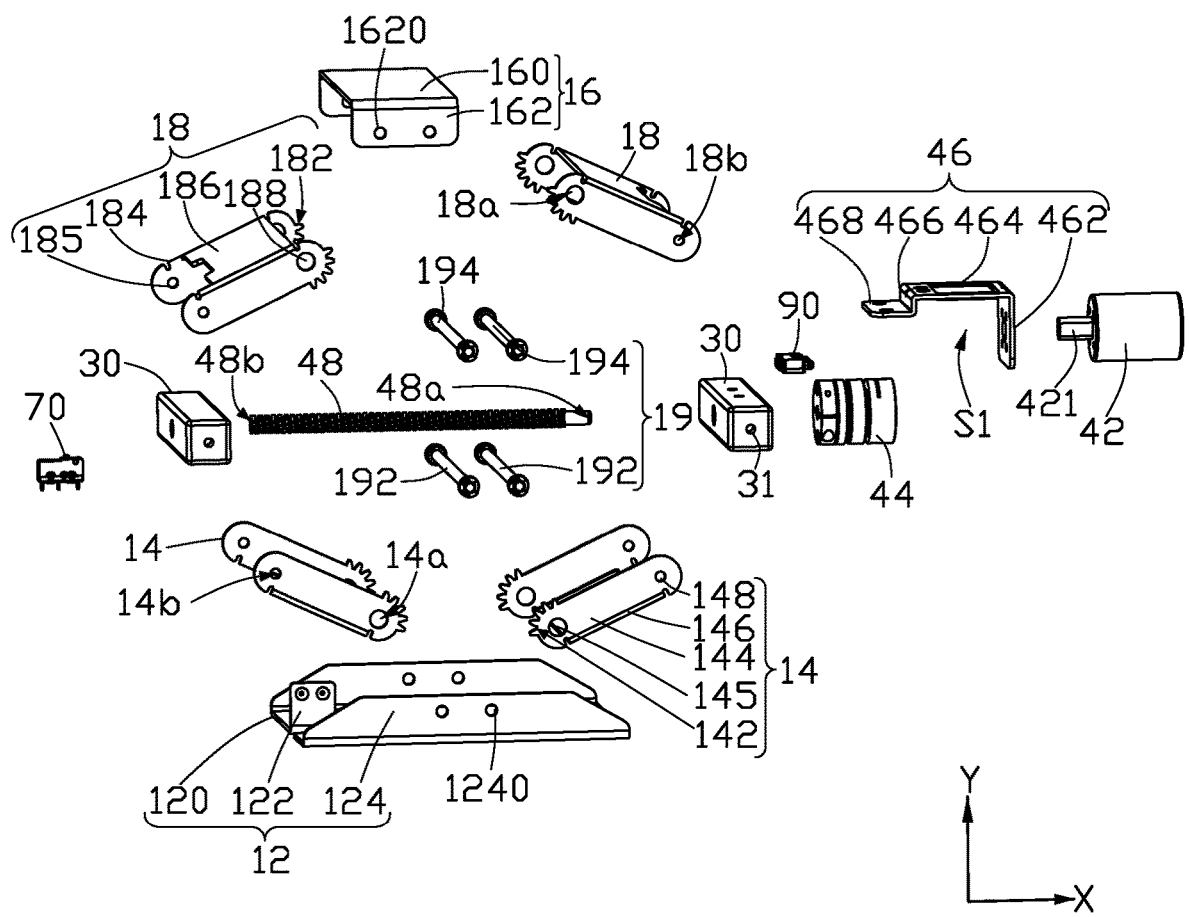
FIG. 2 is an exploded view of the lifting structure of FIG. 1.

Referring to FIGS. 1 and 2, a lifting structure 100 is provided according to an embodiment of the present disclosure. The lifting structure 100 includes a lifting assembly 10 and a driving assembly 40.

The lifting assembly 10 includes a first mounting base 12, two first links 14, a second mounting base 16, two second links 18, a shaft assembly 19, and two seats 30. The shaft assembly 19 includes two first shafts 192 and two second shafts 194. Each of the two first links 14 includes a first end 14a and a second end 14b opposite to the first end 14a. The first ends 14a of the two first links 14 are rotatably connected to the first mounting base 12 through the two first shafts 192. Each of the two second links 18 includes a third end 18a and a fourth end 18b opposite to the third end 18a. The third ends 18a of the two second links 18 are rotatably connected to the second mounting base 16 through the two second shafts 194. The second ends 14b of the two first links 14 are rotatably connected to the fourth ends 18b of the two second links 18 through the two seats 30. The two seats 30 are arranged along a first direction X.

Each of the first links 14 includes two first connecting arms 144 spaced from each other, a first connecting plate 146 connected between the two first connecting arms 144, and a first gear structure 142 provided at the first end 14a of each of the two first connecting arms 144. The first gear structure 142 of one first connecting arm 144 is engaged with the first gear structure 142 of the other first connecting arm 144. The first end 14a of each first connecting arm 144 defines a first through hole 145. The second end 14b of each first connecting arm 144 defines a second through hole 148.

Figure 3:
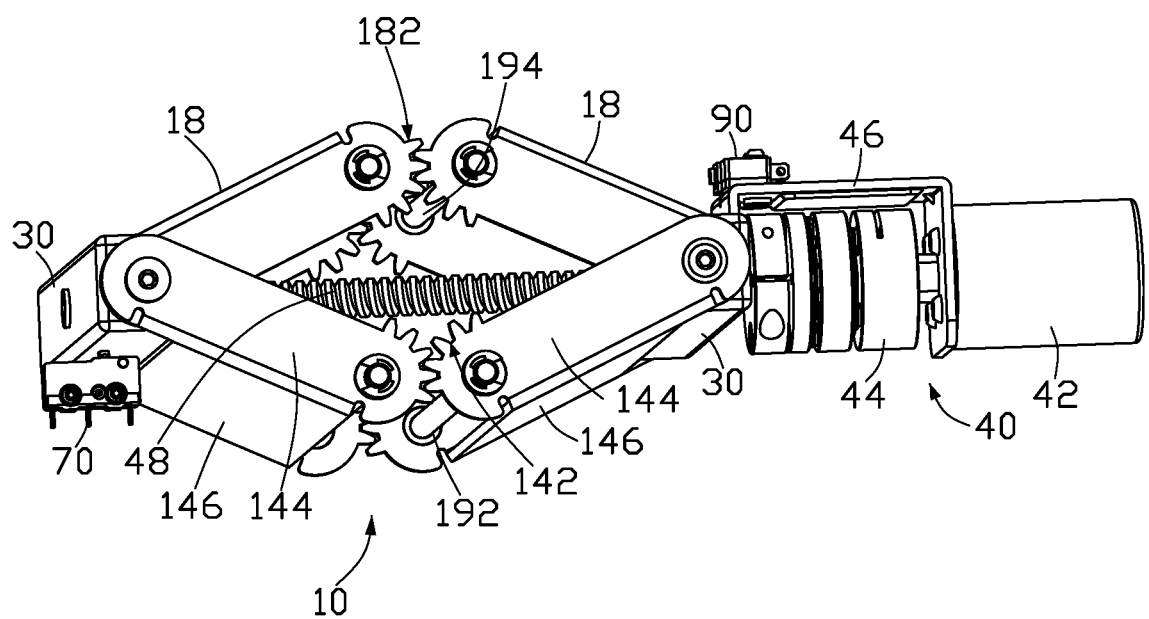
FIG. 3 is a diagrammatic view of the lifting assembly of FIG. 1, with a first mounting base and a second base removed.
Figure 4:
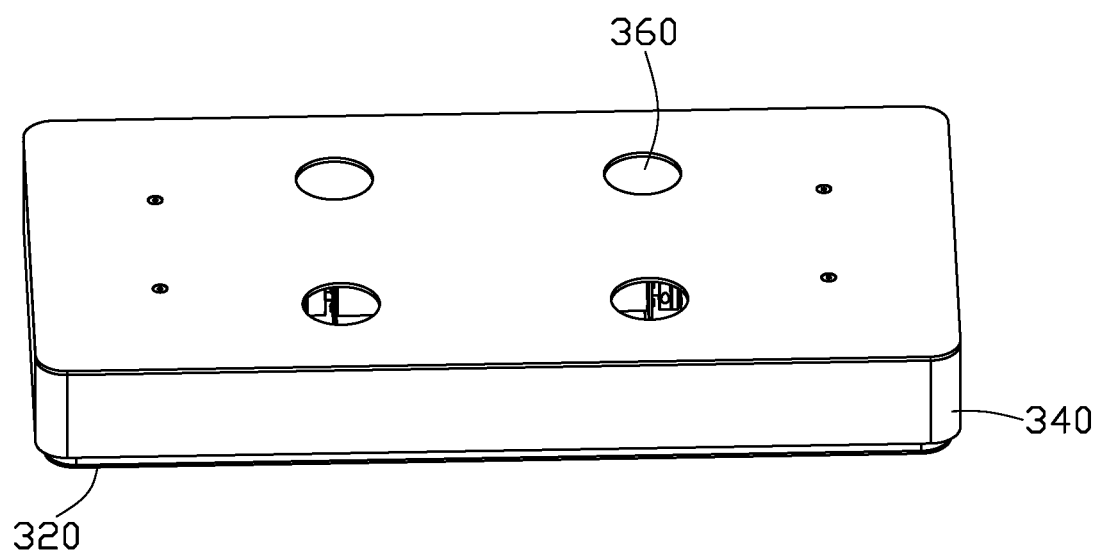
FIG. 4 is a diagrammatic view of a lifting device according to an embodiment of the present disclosure.
Figure 5:
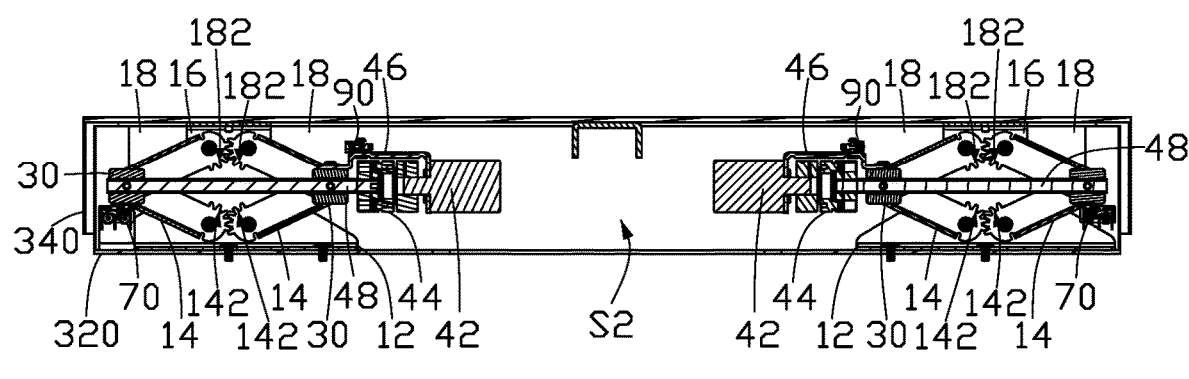
FIG. 5 is a cross-sectional view of the lifting structure of FIG. 4.
Figure 6:
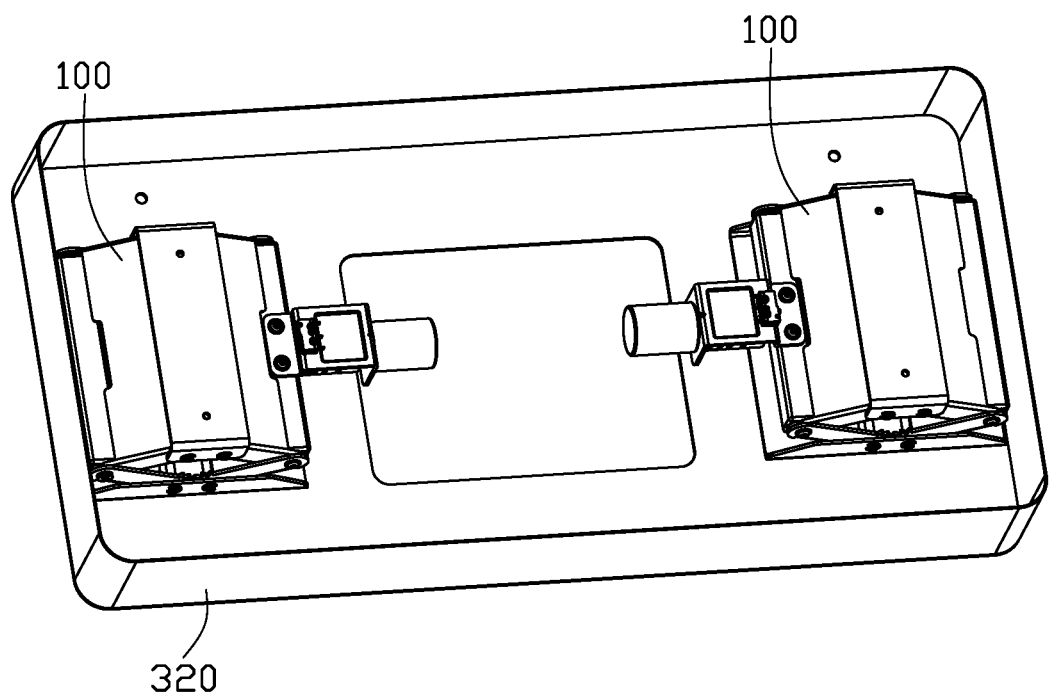
FIG. 6 is a diagrammatic view of the lifting device of FIG. 4, with a second casing removed.
Figure 7:
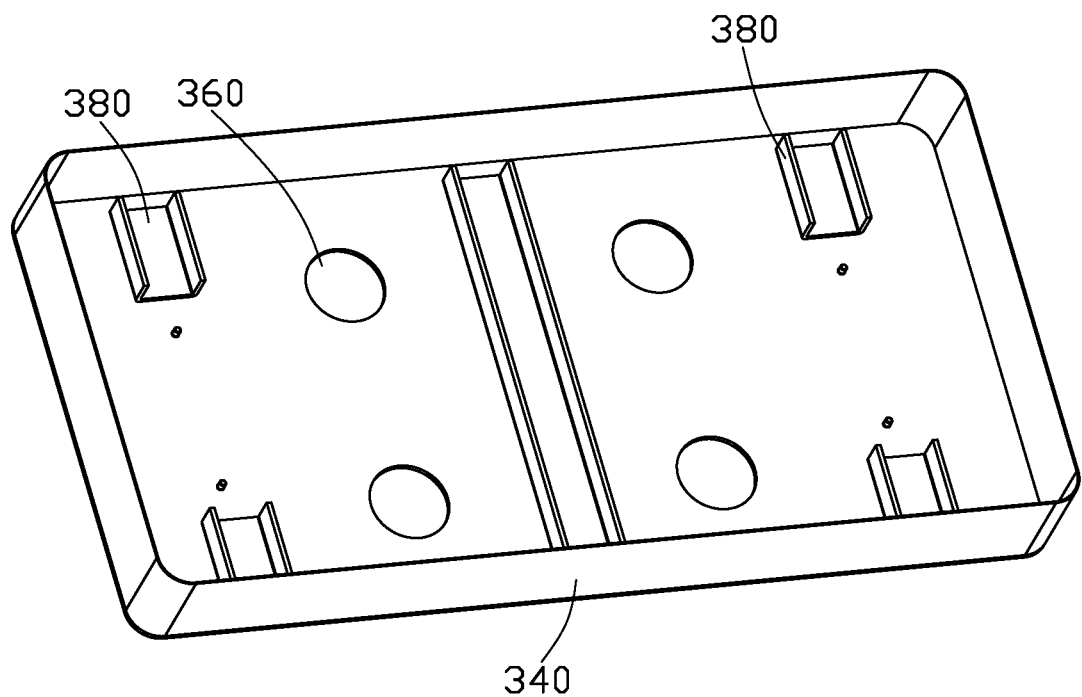
FIG. 7 is a diagrammatic view of a second casing of the lifting structure of FIG. 4.

The second link 18 includes two second connecting arms 184 spaced from each other, a second connecting plate 186 connected between the two second connecting arms 184, and a second gear structure 182 provided at the third end 18a of each of the two second connecting arms 184. Referring to FIG. 3, the second gear structure 182 of one second connecting arm 184 is engaged with the second gear structure 182 of the other second connecting arm 184. The third end 18a of each second connecting arm 184 defines a third through hole 185. The fourth end 18b of the second connecting arm 184 defines a fourth through hole 188.

In at least one embodiment, the first end 14a and the third end 18a may be hemispherical in shape. Each of the first gear structure 142 and the second gear structure 182 may be defined on the hemispherical edges.

Referring to FIG. 2, the seat 30 is substantially a rectangular hollow body. Two opposite surfaces of the seat 30 define two first holes 31. A screw (not shown) passes through the second through hole 148 of the first link 14, the fourth through hole 188 of the second link 18, and the two first holes 31, thereby allowing the first link 14 to rotatably connect to the second link 18.

Referring to FIGS. 1 and 2, the first mounting base 12 includes two first side plates 124 and a bottom plate 120 connected between the two first side plates 12. Each first side plate 124 defines two second holes 1240. The first shaft 192 passes through the second hole 1240 of one first side plate 124, the first through hole 145 of the first link 14, and the second hole 1240 of the other first side plate 124, thereby allowing each first link 14 to rotatably connect to the first side plates 124.

The second mounting base 16 includes two second side plates 162 and a top plate 160 connected between the two second side plates 162. The second side plate 162 defines two third holes 1620. The second shaft 194 passes through the third hole 1620 of one second side plate 162, the fourth through hole 188 of the second link 18, and the third hole 1620 of the other second side plate 162, thereby allowing each second link 18 to rotatably connect to the second side plates 162.

Referring to FIGS. 1 to 3, the drive assembly 40 includes a motor 42, a coupling 44, a mounting bracket 46, and a screw bolt 48. The screw bolt 48 extends along the first direction X, and includes a fifth end 48a and a sixth end 48b opposite to the first end 48a. An output shaft 421 of the motor 42 is connected to the fifth end 48a of the screw bolt 48 through the coupling 44. The motor 42 can rotate the screw bolt 48. The screw bolt 48 passes through the two seats 30. One of the seats 30 defines inner screw threads (not shown) matching the external screw threads defined on the screw bolt 48. Thus, when the screw bolt 48 rotates, the seat 30 having the inner screw threads moves towards or away from the other seat 30 along the first direction X. Then, the first links 14 are rotated relative to the two second links 18, so that the second mounting base 16 is lifted or lowered along the second direction Y. During the rotation, the first gear structure 142 of one first connecting arm 144 is engaged with the first gear structure 142 of the other first connecting arm 144, and the second gear structure 182 of one second connecting arm 184 is engaged with the second gear structure 182 of the other second connecting arm 184. Thus, the lifting and lowering process of the second mounting base 16 is more stable.

The motor 42 and the coupling 44 are connected to one of the seats 30 through the mounting bracket 46, the motor 42 and the coupling 44 thus moving up or down along the second direction Y during the lifting and lowering process of the second mounting base 16.

The mounting bracket 46 includes a first mounting plate 462, a second mounting plate 464, a third mounting plate 466, and a fourth mounting plate 468 connected in that order. The first mounting plate 462 and the third mounting plate 466 protrude from a same surface of the second mounting plate 464. The first mounting plate 462 and the third mounting plate 466 may be parallel to each other, and each of the first mounting plate 462 and the third mounting plate 466 may be perpendicular to the second mounting plate 464. The fourth mounting plate 468 extends from the third mounting plate 466 along a direction away from the first mounting plate 462. The fourth mounting plate 468 may be perpendicular to the third mounting plate 466.

The first mounting plate 462, the second mounting plate 464, and the third mounting plate 466 cooperatively form a receiving cavity S1. The coupling 44 is partially received in the receiving cavity S1. The motor 42 is placed on a side of the first mounting plate 462 away from the fourth mounting plate 468. The output shaft 421 of the motor 42 passes through the first mounting plate 462 and extends into the receiving cavity S1. The fourth mounting plate 468 is connected to one of the seats 30 close to the motor 42 and thereby holds the housing (not shown) of the motor 42 in a fixed and permanent position relative to the seat 30.

In at least one embodiment, the lifting structure 100 further includes a first microswitch 70 and a second microswitch 90. The first microswitch 70 is used to determine when the second mounting base 16 reaches a lowest position. The second microswitch 90 is used to determine when the second mounting base 16 reaches a highest position.

The first microswitch 70 is disposed below one of the two seats 30. For example, the first microswitch 70 is below one of the two seats 30 away from the motor 42. When the second mounting base 16 is lowered to the lowest position, the seat 30 contacts a probe or head of the first microswitch 70 to trigger the first microswitch 70. The lifting structure 100 may further include a first indication unit (for example, an LED lamp) electrically connected to the first microswitch 70. The first indication unit outputs an indication signal when the first microswitch 70 is triggered, thereby indicating that the second mounting base 16 is lowered to the lowest position.

The second microswitch 90 is disposed on a side of one of the two seats 30 away from the other seat 30. For example, the second microswitch 90 is disposed on a side of one of the two seats 30 close to the motor 42. During the lifting process of the second mounting base 16, a distance between the second connecting plate 186 of the corresponding second link 18 and the second microswitch 90 is decreased. When and the second mounting base 16 is lifted to the highest position, the second connecting plate 186 contacts a probe head of the second microswitch 90 to trigger the second microswitch 90. The lifting structure 100 may further include a second indication unit (for example, an LED lamp) electrically connected to the second microswitch 90. The second indication unit outputs an indication signal when the second microswitch 90 is triggered, thereby indicating that the second mounting base 16 is at the highest position. In at least one embodiment, at the highest position, each first link 14 is collinear with the corresponding second link 18 rotatably connected thereto.

In at least one embodiment, the first mounting base 12 further includes a third connecting plate 122 mounted on the bottom plate 120. The third connecting plate 122 is disposed between the two first side plates 124. The first microswitch 70 is mounted on the third connecting plate 122. In at least one embodiment, the second microswitch 90 is disposed on the second mounting plate 464 of the mounting bracket 46.

Referring to FIGS. 4 to 7, an embodiment of a lifting device 300 including at least one lifting structure 100 is also provided. The lifting device 300 may be applied in a robot (not shown), which is used to lift or lower an object through the lifting device 300. The lifting device 300 further includes a first support member 320 and a second support member 340 surrounding the first support member 320. The second support member 340 may surround the first support member 320. The first support member 320 and the second support member 340 cooperatively form a receiving space S2. The at least one lifting structure 100 is received in the receiving space S2. The first mounting base 12 of the lifting structure 100 is mounted on the first support member 320. The second mounting base 16 of the lifting structure 100 is mounted on the second support member 340. When the lifting structure 100 is lifted, the second support member 340 moves up and away from the first support member 320. In at least one embodiment, the lifting device 300 includes two lifting structures 100, enabling perfect horizontality to be found for the second support member 340 and its cargo before a lifting or lowering process.

In at least one embodiment, each of the first support member 320 and the second support member 340 is a hollow casing with an opening. In other embodiments, each of the first support member 320 and the second support member 340 may be a flat plate.

In at least one embodiment, a cross beam 380 is provided on the second support member 340. The second mounting base 16 can be mounted on the cross beam 380. The cross beam 380 improves a strength of the second support member 340.

Figure 8:
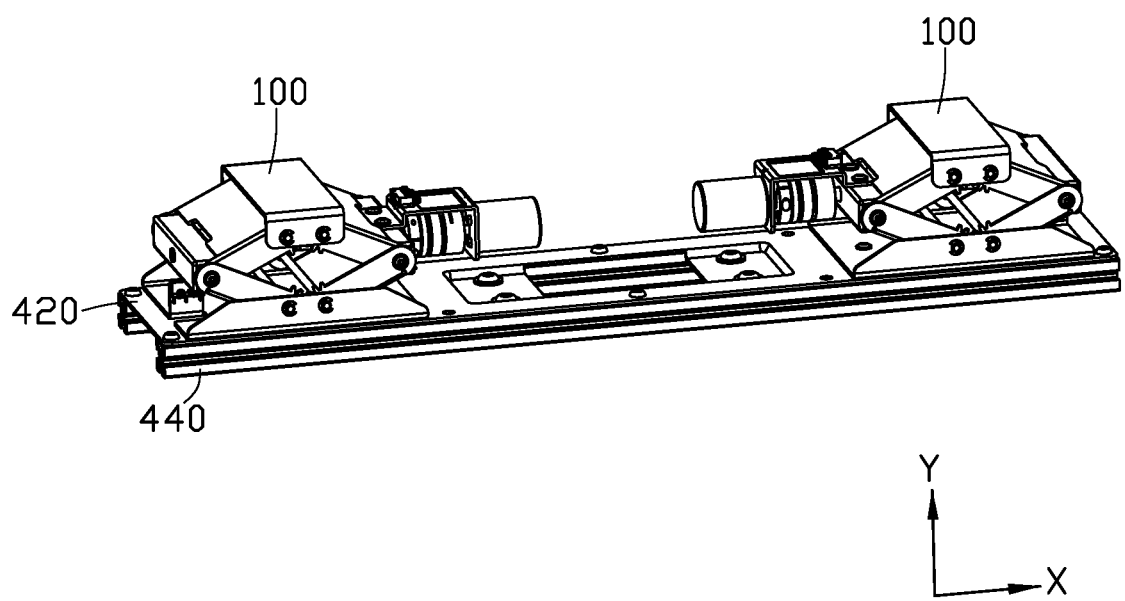
FIG. 8 is a diagrammatic view of a lifting device according to another embodiment of the present disclosure.

Referring to FIG. 8, an embodiment of a lifting device 400 including at least one lifting structure 100 is also provided. The difference from the lifting device 300 is that the first support member 420 is a flat plate. The support member 440 includes two supporting rods. The first support member 420 is mounted on the two supporting rods. The lifting structure 100 is mounted on the first support member 420.

In at least one embodiment, each supporting rod of the support member 440 is an aluminum extrusion rod, which increases a strength of the first support member 420.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A lifting structure, comprising:
    a lifting assembly comprising two first links, two second links, and two seats; each of two first links comprising at least one first connecting arm each having a first end and a second end, a first gear structure provided on the first end of each of the at least one first connecting arm; each of the two second links comprising at least one second connecting arm each having a third end and a fourth end, a second gear structure provided on the third end of each of the at least one second connecting arm; the first gear structure of one of the two first links engaged with the first gear structure of the other one of the two first links, the second gear structure of one of the two second links engaged with the second gear structure of the other one of the two second links;
    the second end rotatably connected to the fourth end through one of the two seats; and
    a driving assembly configured to drive the two seats to move toward or away from each other, thereby causing the third end to be lifted or lowered relative to the first end;
    wherein the driving assembly comprises a motor, a screw bolt, and a mounting bracket; the screw bolt comprises a fifth end and a sixth end, an output shaft of the motor is connected to the fifth end through the coupling; the screw bolt passes through the two seats; the motor is configured to drive the screw bolt to rotate, thereby causing the two seats to move toward or away from each other;
    wherein the mounting bracket comprises a first mounting plate, a second mounting plate, a third mounting plate, and a fourth mounting plate connected in that order; the first mounting plate and the third mounting plate are connected to two ends of the second mounting plate, the first mounting plate and the third mounting plate protrude vertically from a same surface of the second mounting plate, and are parallel to each other, the first mounting plate is located between the second mounting plate and the motor; the fourth mounting plate extends vertically from the third mounting plate away from the first mounting plate; the first mounting plate, the second mounting plate, and the third mounting plate cooperatively form a receiving cavity, the coupling is partially received in the receiving cavity; the motor is placed on a side of the first mounting plate away from the second mounting plate; the output shaft passes through a hole of the first mounting plate and further extends into the receiving cavity; the fourth mounting plate is connected to one of the seats close to the motor.

2. The lifting structure according to claim 1, wherein the lifting assembly further comprises a first mounting base, a second mounting base, and a shaft assembly; the shaft assembly comprises two first shafts and two second shafts; the first mounting base and the first ends of the two first links are rotatably connected to each other by the two first shafts; the second mounting base and the third ends of the two second links are rotatably connected by the two second shafts; the third end drives the second mounting base to be lifted or lowered relative to the first mounting base.

3. The lifting structure according to claim 1, wherein each of the two first links comprises two first connecting arms and a first connecting plate connected between the two first connecting arms.

4. The lifting structure according to claim 1, wherein each of the two second links comprises two second connecting arms and a second connecting plate connected between the two second connecting arms.

5. The lifting structure according to claim 4, further comprising a first microswitch, wherein the first microswitch is disposed below one of the two seats; the first microswitch is configured to contact the one of the two seats when the second mounting base is lowered to a lowest position.

6. The lifting structure according to claim 5, further comprising a second microswitch, wherein the second microswitch is disposed on one of the two seats away from the other one of the two seats; the second microswitch is configured to contact the second connecting plate when the second mounting base is lifted to a highest position.

7. A lifting device, comprising:
    a first support member; and
    at least one lifting structure mounted on the first support member, each of the at least one lifting structure comprising:
        a lifting assembly comprising two first links, two second links, and two seats; each of two first links comprising at least one first connecting arm each having a first end and a second end, a first gear structure provided on the first end of each of the at least one first connecting arm; each of the two second links comprising at least one second connecting arm each having a third end and a fourth end, a second gear structure provided on the third end of each of the at least one second connecting arm; the first gear structure engaged with the second gear structure, and the second end rotatably connected to the fourth end through one of the two seats; and
    a driving assembly configured to drive the two seats to move toward or away from each other, thereby causing the third end to be lifted or lowered relative to the first end;
    wherein the driving assembly comprises a motor, a screw bolt, and a mounting bracket; the screw bolt comprises a fifth end and a sixth end, an output shaft of the motor is connected to the fifth end through the coupling; the screw bolt passes through the two seats; the motor is configured to drive the screw bolt to rotate, thereby causing the two seats to move toward or away from each other:
    wherein the mounting bracket comprises a first mounting plate, a second mounting plate, a third mounting plate, and a fourth mounting plate connected in that order; the first mounting plate and the third mounting plate are connected to two ends of the second mounting plate, the first mounting plate and the third mounting plate protrude vertically from a same surface of the second mounting plate, and are parallel to each other, the first mounting plate is located between the second mounting plate and the motor; the fourth mounting plate extends vertically from the third mounting plate away from the first mounting plate; the first mounting plate, the second mounting plate, and the third mounting plate cooperatively form a receiving cavity, the coupling is partially received in the receiving cavity; the motor is placed on a side of the first mounting plate away from the second mounting plate; the output shaft passes through a hole of the first mounting plate and further extends into the receiving cavity; the fourth mounting plate is connected to one of the seats close to the motor.

8. The lifting device according to claim 7, wherein the lifting assembly further comprises a first mounting base, a second mounting base, and a shaft assembly; the shaft assembly comprises two first shafts and two second shafts; the first mounting base and the first ends of the two first links are rotatably connected to each other by the two first shafts; the second mounting base and the third ends of the two second links are rotatably connected by the two second shafts; the third end drives the second mounting base to be lifted or lowered relative to the first mounting base.

9. The lifting device according to claim 7, wherein each of the two first links comprises two first connecting arms and a first connecting plate connected between the two first connecting arms.

10. The lifting device according to claim 7, wherein each of the two second links comprises two second connecting arms and a second connecting plate connected between the two second connecting arms.

11. The lifting device according to claim 10, further comprising a first microswitch, wherein the first microswitch is disposed below one of the two seats; the first microswitch is configured to contact the one of the two seats when the second mounting base is lowered to a lowest position.

12. The lifting device according to claim 11, further comprising a second microswitch, wherein the second microswitch is disposed on one of the two seats away from the other one of the two seats; the second microswitch is configured to contact the second connecting plate when the second mounting base is lifted to a highest position.

* * * * *